United States Patent
Torno et al.

(10) Patent No.: US 6,318,085 B1
(45) Date of Patent: Nov. 20, 2001

(54) AMBIENT AIR-PULSED VALVE CONTROL

(75) Inventors: Oskar Torno, Schwieberdingen; Carsten Kluth, Stuttgart; Werner Häming, Neudenau; Iwan Surjadi, Vaihingen; Steffen Franke, Schwieberdingen; Michael Bäuerle, Markgröningen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/402,129

(22) PCT Filed: Nov. 28, 1997

(86) PCT No.: PCT/DE97/02779

§ 371 Date: Jan. 24, 2000

§ 102(e) Date: Jan. 24, 2000

(87) PCT Pub. No.: WO98/44249

PCT Pub. Date: Oct. 8, 1998

(30) Foreign Application Priority Data

Mar. 27, 1997 (DE) ............................................. 197 12 850

(51) Int. Cl.⁷ ................................................. F02B 33/44
(52) U.S. Cl. ................. 60/611; 60/600; 60/602; 60/612; 123/337
(58) Field of Search ............................. 60/600, 602, 611, 60/612; 123/337

(56) References Cited

U.S. PATENT DOCUMENTS

| 4,282,713 | * | 8/1981 | Antoku et al. .......................... 60/600 |
| 4,434,775 | * | 3/1984 | Yoshimura et al. .................... 60/611 |
| 5,083,543 |   | 1/1992 | Harada et al. .......................... 60/612 |
| 5,103,791 |   | 4/1992 | Tomisawa . |
| 5,201,790 | * | 4/1993 | Mukai et al. ........................... 60/612 |
| 6,018,949 | * | 2/2000 | Brosecke et al. ....................... 60/602 |

FOREIGN PATENT DOCUMENTS

| 28 23 067 | 12/1978 | (DE) . |
| 196 39 146 | 11/1997 | (DE) . |
| 06 117263 | 4/1994 | (JP) ..................................... 123/337 |

* cited by examiner

*Primary Examiner*—Thomas Denion
*Assistant Examiner*—Thai-Ba Trieu
(74) *Attorney, Agent, or Firm*—Kenyon & Kenyon

(57) ABSTRACT

In the apparatus for controlling a coasting air recirculation valve of the turbocharger of an internal combustion engine, the coasting air recirculation valve is arranged in the coasting air recirculation line bypassing a compressor in the intake duct, and the coasting air recirculation valve is controllable by way of the intake duct pressure on the downstream side of the throttle valve. In order to ensure defined opening and closing of the coasting air recirculation valve, an additional control pressure, with which the coasting air recirculation valve can be opened independently of the intake duct pressure, can be delivered to the coasting air recirculation valve.

6 Claims, 2 Drawing Sheets

AMBIENT AIR-PULSED VALVE CONTROL

FIELD OF THE INVENTION

The present invention relates to an apparatus for controlling a coasting air recirculation valve of the turbocharger of an internal combustion engine, the coasting air recirculation valve being arranged in a coasting air recirculation line that bypasses a compressor in the intake duct, and the coasting air recirculation valve being controllable by way of the intake duct pressure on the downstream side of the throttle valve.

BACKGROUND INFORMATION

A conventional apparatus is described in German Patent No. 28 23 067. In this German Patent, the coasting air recirculation valve is activated exclusively pneumatically by the intake duct pressure: the coasting air recirculation valve opens when a certain negative pressure, occurring while the vehicle is in coasting mode, is present in the intake duct on the outflow side of the throttle valve. The fact that the outlet of the compressor is connected to its inlet via the coasting air recirculation line causes a decrease in the boost pressure in the intake duct downstream from the compressor, which is expressed as better engine response to rapid closing of the throttle valve. The opening or closing behavior of the coasting air recirculation valve is not optimally defined in the case of activation exclusively by way of the intake duct pressure.

U.S. Pat. No. 5,083,543 describes a coasting air recirculation valve which has its control pressure delivered from a negative pressure vessel. This negative pressure vessel is fed from the intake duct pressure. The coasting air recirculation valve is thus controlled solely as a function of the intake duct pressure.

Japanese Patent Application No. 06 117 263 (provided in, e.g., Patent Abstracts of Japan, Vol. No. 408, Jul. 29, 1994) describes a coasting air recirculation valve which is controlled as a function of the negative pressure in the intake duct on the downstream side of the throttle valve, and which is located in a coasting air recirculation line. Inserted in a line between the intake duct downstream side and the coasting air recirculation valve is a vacuum vessel whose negative pressure depends solely on the negative pressure in the intake duct on the downstream side of the throttle valve. The purpose of the vacuum vessel is to damp air flow noises that occur when the coasting air recirculation valve is opened.

It is therefore the object of the present invention to describe an apparatus of the kind cited initially that allows highly defined opening and closing of the coasting air recirculation valve.

SUMMARY OF THE INVENTION

This object is achieved with an electrically controllable solenoid valve according to the present invention, which delivers to the coasting air recirculation valve (as a function of a control signal) either the intake duct pressure or a control pressure, independent thereof, from a negative pressure vessel. Thus, it is possible to prevent the coasting air recirculation valve from being prematurely closed by the negative intake duct pressure on the downstream side of the throttle valve in the event of rapid closure of the throttle valve due to pumping of the boost air column. The boost pressure is uniformly and continuously decreased. Boost pressure fluctuations, and jerking of the vehicle caused thereby, are prevented.

It is advantageous for a control signal activating the solenoid valve to be emitted if the load gradient of the engine exceeds a threshold that depends on reference boost pressure. The load gradient can have a predictive value superimposed on it if the current load gradient has risen as compared with the load gradient existing one timing cycle earlier.

It is advantageous for a control signal activating the solenoid valve to be made available if the absolute intake duct pressure lies below a pressure threshold at which the coasting air recirculation valve would open. A control signal activating the solenoid valve should then be made available if the absolute intake duct pressure exceeds the pressure threshold. The pressure threshold can be taken from a characteristics diagram that depends on the actual boost pressure and the ambient pressure.

DETAILED DESCRIPTION

Figure 1:
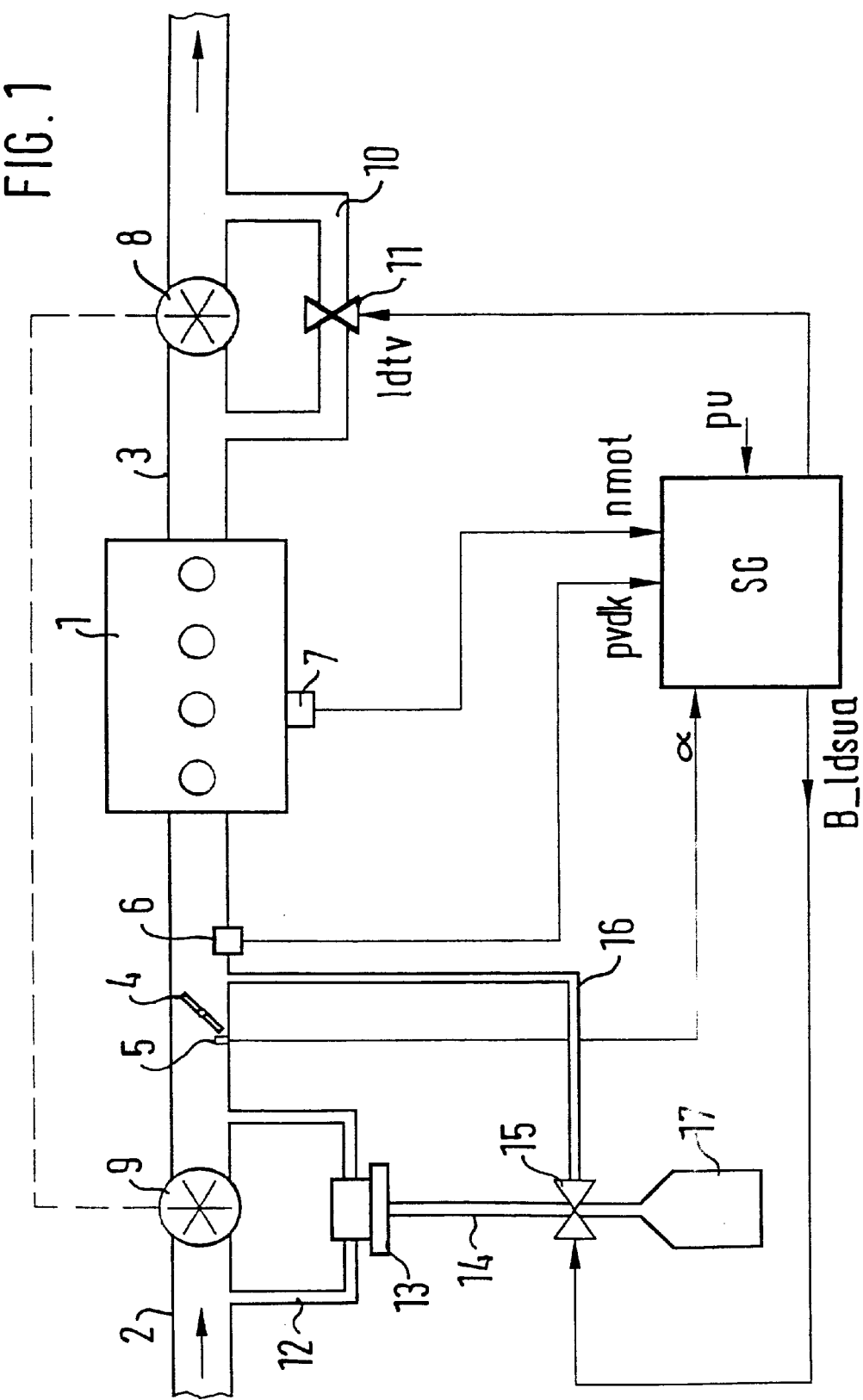
FIG. 1 shows a schematic block diagram of an engine which includes an apparatus according to the present invention.

FIG. 1 shows an internal combustion engine 1 having an intake duct 2 and an exhaust conduit 3. Located in intake duct 2 are a throttle valve 4 and a sensor 5 for sensing the opening angle α of throttle valve 4. Also arranged in intake duct 2, on the downstream side of throttle valve 4, is a pressure sensor 6 for sensing the actual boost pressure pvdk. An engine speed sensor 7, for sensing the engine speed nmot, is mounted on internal combustion engine 1. A control unit SG receives as input signals the opening angle α of throttle valve 4, the actual boost pressure pvdk, the engine speed nmot, and a measured ambient pressure pu.

The internal combustion engine is equipped with a turbocharger, an exhaust gas turbine 8 being arranged in exhaust conduit 3, and a compressor 9 in intake duct 2. Compressor 9 is driven by exhaust gas turbine 8 via a shaft 10. Exhaust gas turbine 8 is bypassed in a conventional manner by a bypass line 10 in which a bypass valve 11 is arranged. The control signal ldtv for bypass valve 11 is generated in control device SG. The manner in which bypass valve 11 is controlled is not described here in further detail.

Compressor 9 in intake duct 2 is bypassed by a coasting air recirculation line 12 through which air can be returned from intake duct 2 on the delivery side of compressor 9 into intake duct 2 on the suction side of compressor 9. Inserted into coasting air recirculation line 12 is a pneumatic coasting air recirculation valve 13 that is connected to a control line 14. The pressure on control line 14 governs whether coasting air recirculation valve 13 opens or closes.

An electrically controllable solenoid valve 15 is located in the control line. If this solenoid valve 15 is closed, control line 14 is connected to a line 16 that opens into intake duct 2 on the downstream side of throttle valve 4. In this situation the pressure existing on the downstream side of throttle valve 4 is applied to coasting air recirculation valve 13. When throttle valve 4 closes, for example when the vehicle is coasting, a negative pressure is created on the downstream side of throttle valve 4. Once this negative pressure acting on coasting air recirculation valve 13 has fallen below a certain threshold, valve 13 opens, so that a pressure decrease occurs, via the coasting air recirculation valve, on the delivery side of compressor 9 in intake duct 2. The boost pressure on the upstream side of throttle valve 4 thus decreases. This prevents any oscillation in the boost pressure.

Control of coasting air recirculation valve 13 solely by way of the pressure on the downstream side of throttle valve 4 does not result in optimally defined opening or closing behavior of coasting air recirculation valve 13. This shortcoming can be eliminated by the fact that coasting air recirculation valve 13 is controllable independently of the pressure in intake duct 2 on the downstream side of throttle valve 4. For this purpose, a negative pressure vessel 17 is connected to electrically controllable solenoid valve 15. When solenoid valve 15 is opened, negative pressure is delivered to coasting air recirculation valve 13 from negative pressure vessel 17 via control line 14, resulting in immediate opening of coasting air recirculation valve 13. A control signal B_ldsua present at solenoid valve 15 determines whether solenoid valve 15 is open or closed. This control signal B_ldsua is generated by control unit SG. The conditions under which the control signal B_ldsua is made available to activate solenoid valve 15 will be described below with reference to FIG. 2.

Figure 2:
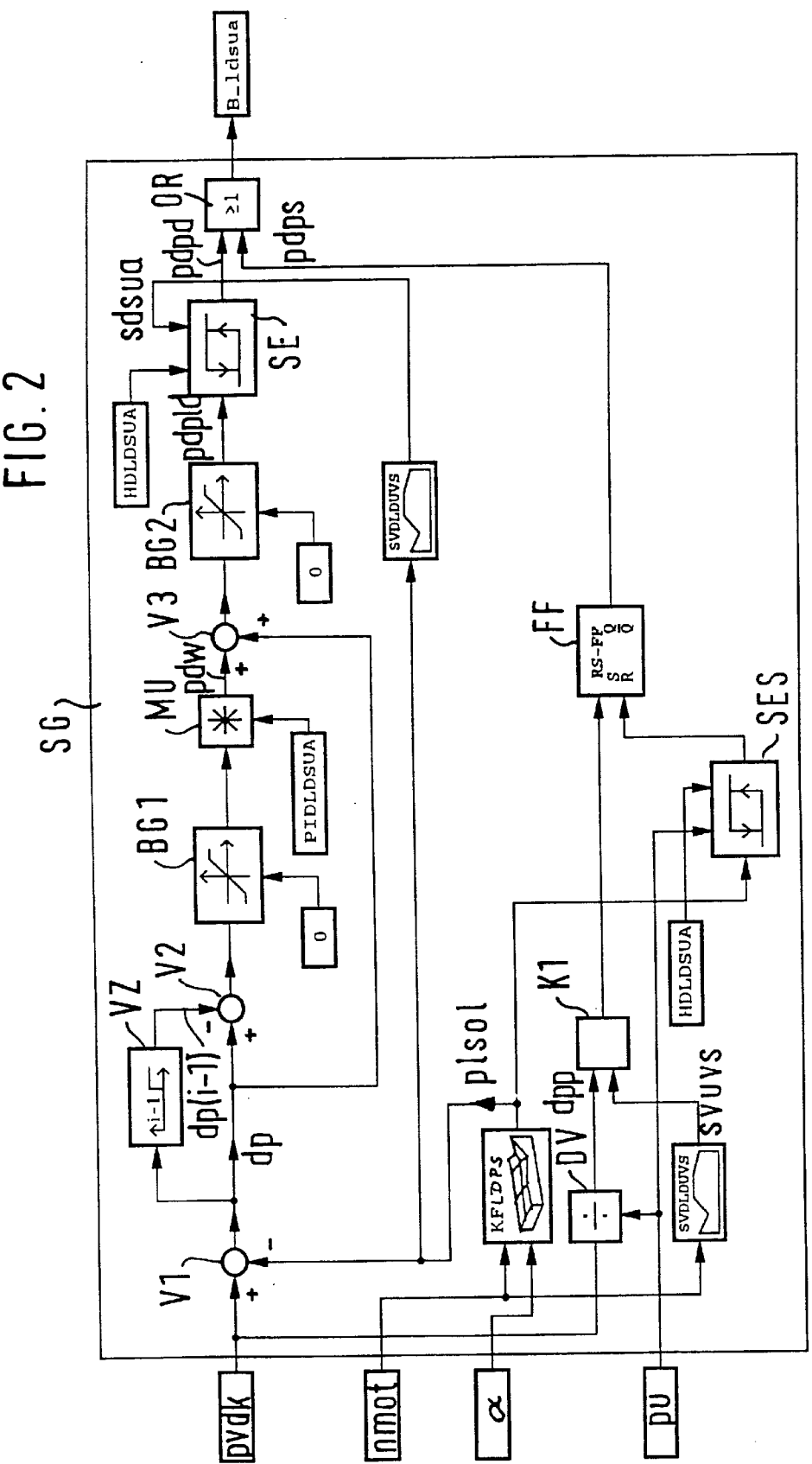
FIG. 2 shows a functional diagram of the apparatus according to the present invention.

As shown in the functional diagram in FIG. 2, the control signal B_ldsua is set to a logical "1" at the output of an OR gate OR, and thus activates solenoid valve 15, when either a signal pdpd or a signal pdps is present at the inputs of OR gate OR.

The signal pdpd is intended to ensure very fast activation of solenoid valve 15 during dynamic operation of the internal combustion engine. The signal pdpd for dynamic operation is set (logical "1") if the load gradient of the engine satisfies the condition described below. The load gradient dp is the difference, determined at node V1, between the actual boost pressure pvdk that is measured on the downstream side of throttle valve 4 in intake duct 2, and a reference boost pressure plsol. The reference boost pressure plsol can be read out, in known fashion, from a characteristics diagram KFLDPS that depends on the engine speed nmot and the opening angle α of the throttle valve.

From the signal dp for the load gradient, a predictive value pdw is created by first taking, at a node V2, the difference between the current load gradient dp and a load gradient dp(i−1) existing one timing cycle earlier (i−1). A delay element VZ makes the previous load gradient dp(i−1) available at its output. The difference signal is then sent through a limiter BG1 that sets it to zero if the current load gradient dp is less than or equal to the previous load gradient dp(i−1). In a multiplier MU, the predictive value pdw is multiplied by an applicable time interval PIDLDSUA. In node V3, this predictive value, existing only for the specific time interval, is superimposed on the signal dp for the load gradient. A signal value pdpld that is elevated with respect to the current load gradient is therefore present, for the aforesaid time interval, at the output of node V3.

The predictive value pdw thus has a positive value deviating from zero only if the current load gradient dp is greater than the load gradient dp(i−1) existing one timing cycle earlier. In other words, the reference boost pressure plsol has decreased with respect to the actual boost pressure pvdk because of an increasing decrease in the opening angle of the throttle valve. Coasting air recirculation valve 13 would now need to be opened immediately if the load gradient exceeds a specific threshold. Superimposition of the predictive value pdw causes the load gradient to reach this predefined threshold more quickly, thus resulting in earlier or quicker opening of solenoid valve 15, and consequently in timely opening of coasting air recirculation valve 13.

The summed signal pdpld made up of the signal dp for the load gradient and the predictive value pdw is sent, prior to the threshold value decision, through a limiter BG2 that allows only positive values of the signal pdpld to pass. A threshold value decider SE performs the aforesaid comparison between the signal pdpld and the predefinable threshold sdsua. The threshold sdsua is taken from a characteristic curve SDLDSUA that is a function of the reference boost pressure plsol. In the range close to full load, the threshold sdsua is much greater than when the internal combustion is operating close to idle. If the signal pdpld has exceeded the threshold sdsua, the signal pdpd is present with a logical "1" at the output of threshold value decider SE. Threshold value decider SE possesses a hysteretic characteristic curve according to which the output signal pdpd is reset to zero after a predefinable hysteresis HDLDSUA. The hysteresis describes the difference between the lower and upper switching point, and must be adapted to the particular engine so as to prevent the signal pdpd from switching back and forth in undefined fashion.

The second signal pdps present at the input of OR gate OR is to be set (logical "1") if the following pressure conditions exist:

A divider DV forms, from the actual boost pressure pvdk and the ambient pressure pu, a quotient dpp that corresponds approximately to the compressor pressure ratio.

This quotient dpp is compared by a comparator K1 to a threshold svuvs. The threshold svuvs is taken from a characteristic curve SVDLDUVS that is a function of the engine speed nmot. If the quotient dpp falls below the threshold svuvs, the output signal of comparator K1 then sets an RS flip-flop FF. The output signal pdps of RS flip-flop is thus set if the compressor pressure ratio reaches a value at which coasting air recirculation valve 13 could open. RS flip-flop FF—and thus signal pdps, i.e. the control signal B_ldsua for coasting air recirculation valve 13—is reset if the reference boost pressure plsol exceeds the ambient pressure pu. A threshold value decider SES compares the reference boost pressure plsol to the ambient pressure pu. A hysteresis HSLDSUA is taken into account in this threshold value decision in order to prevent the signal pdps from switching back and forth in undefined fashion.

Because the signal pdps, and thus the control signal B_ldsua for solenoid valve 15, are set and reset in the manner described, coasting air recirculation valve 13 is indeed opened when the intake duct pressure on the downstream side of throttle valve 4 has dropped below a certain threshold. Subsequent closure of coasting air recirculation valve 13 is accomplished, however, not in undefined fashion by way of the intake duct pressure, but rather in quite defined fashion by way of the control signal B_ldsua for solenoid valve 15, which disconnects the negative pressure out of negative pressure vessel 17 from control line 14 only when the reference boost pressure plsol exceeds the ambient pressure pu, taking into account a hysteresis HSLDSUA.

What is claimed is:

1. An apparatus for controlling a coasting air recirculation valve of a turbocharger of an internal combustion engine, the coasting air recirculation valve being arranged in a coasting air recirculation line of the internal combustion engine, the coasting air recirculation line bypassing a compressor which is disposed in an intake duct, the apparatus comprising:

a negative pressure vessel arrangement; and an electrically controllable solenoid valve delivering, as a function of a control signal, a particular pressure to the coasting air recirculation valve in order to open the coasting air recirculation valve, at least two sources of the particular pressure being available, the particular pressure being one of an intake duct pressure applied on a downstream side of a throttle valve and a control pressure from the negative pressure vessel arrangement, the control pressure being independent of the intake duct pressure.

2. The apparatus according to claim 1, further comprising:

an arrangement measuring an actual boost pressure on the downstream side of the throttle valve and determining a load gradient from a difference between the actual boost pressure and a reference boost pressure, wherein, if the arrangement determines that the load gradient exceeds a predetermined threshold which is dependent on the reference boost pressure, the arrangement generates the control signal which activates the solenoid valve to open the coasting air recirculation valve.

3. The apparatus according to claim 2, wherein the arrangement superimposes a predictive value on the load gradient if a present load gradient rises to a predetermined value with respect to a particular load gradient which existed in a previous timing cycle.

4. The apparatus according to claim 3, wherein the arrangement generates the predictive value by determining a difference between a present load gradient and the particular load gradient, and wherein the predictive value is limited to be within a predetermined time interval.

5. The apparatus according to claim 1, further comprising:

an arrangement providing the control signal which activates the solenoid valve if a ratio between the intake duct pressure and an ambient pressure is below a predetermined threshold, the arrangement providing the control signal for opening the coasting air recirculation valve.

6. The apparatus according to claim 5, wherein, after the arrangement activates the solenoid valve, the arrangement deactivates the solenoid valve with a hysteresis.

* * * * *